United States Patent [19]

Huang

[11] Patent Number: 4,820,453
[45] Date of Patent: Apr. 11, 1989

[54] WATER LEVEL DETECTOR AND CIRCUIT FOR AN ELECTRIC HUMIDIFIER

[76] Inventor: Chuang-Pang Huang, No. 30, Lane 628, Gong Yuan Road, Tainan, Taiwan

[21] Appl. No.: 122,031

[22] Filed: Nov. 17, 1987

[51] Int. Cl.$^4$ .............................................. B01D 47/00
[52] U.S. Cl. ................................ 21/26; 261/DIG. 48
[58] Field of Search .................... 261/81, DIG. 48, 26

[56] References Cited

U.S. PATENT DOCUMENTS 3,989,042 11/1976 Mitsui et al. ................ 261/DIG. 48

FOREIGN PATENT DOCUMENTS 0027252 3/1978 Japan ......................... 261/DIG. 48

Primary Examiner—William E. Wayner
Attorney, Agent, or Firm—Holman & Stern

[57] ABSTRACT

An electric humidifier includes a water level detector needle set in the water cistern. When the water level is normal the needle detector applies a positive bias to the base of a first transistor in a bias supply loop circuit, and the transistor conducts to supply bias current to an ultrasonic oscillation circuit, and to apply a positive bias to the base of a second transistor such that the ultrasonic oscillation circuit drives an ultrasonic transducer and the second transistor conducts supply current to a fan motor. An insufficient water level causes cutoff of the first and second transistors and thus also cutoff of the ultrasonic oscillation circuit and fan.

1 Claim, 4 Drawing Sheets

WATER LEVEL DETECTOR AND CIRCUIT FOR AN ELECTRIC HUMIDIFIER

SUMMARY OF THE INVENTION

This invention relates to an improvement in detecting the water level and in the circuit system of a humidifier.

The above mentioned improvement in detecting the water level and in the circuit system of a humidifier is indicated in that the traditional humidifier used a floating water level switch to cut off the power and can burn down the humidifier owing to the unsuitable position of the float switch. Such shortcomings can be eliminated by using a needle detector which directly sticks out from the water tank. At the same time, when the water level is not enough it is also used to cut off the power source of a bias circuit to attain the safety of users, and so that the machines will not easily be destroyed.

DETAILED DESCRIPTION OF THE INVENTION

Figure 3:
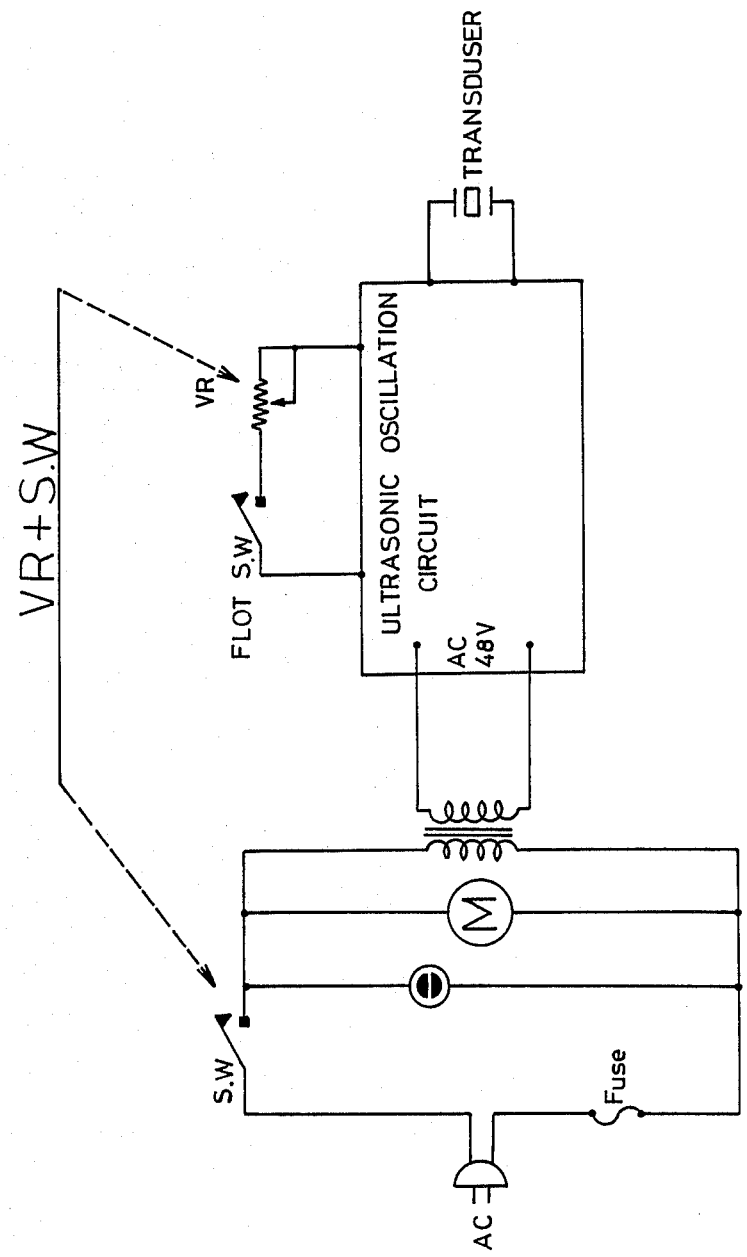
FIG. 3 is a circuit system diagram of a traditional type which uses a floating water level switch.
Figure 4:
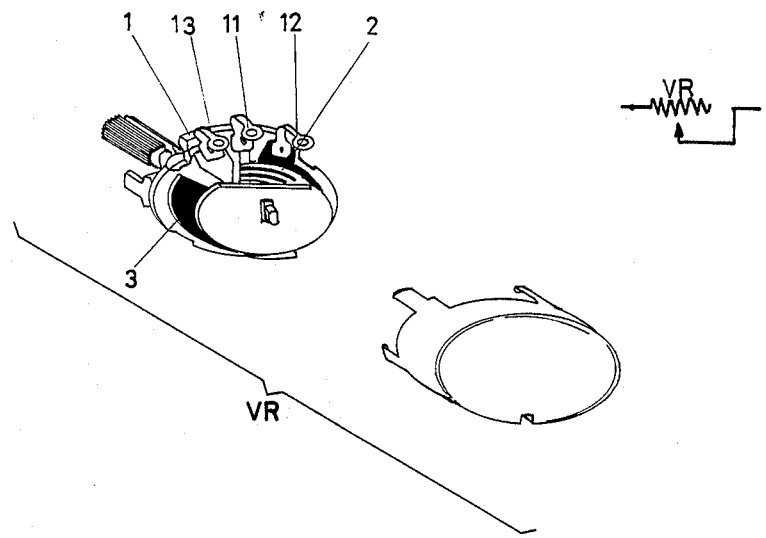
FIG. 4 is a three-dimensional diagram exploded view of the decomposition of the variable resistor VR in this invention and its equivalent rotation diagram.

The traditional humidifier adopted a floating water level switch to detect the water level in a cistern (as in FIG. 3) and used a variable resistance (VR) with an extra switch to cut off the main power source. As if the user has not enough common sense in using electricity and he does not do the daily wipe, maintenance or due to movement or careless turn down and the variable resistance switch (VR) did not timely cut off, trouble may result.

If the floating ball switch goes upward slightly while in the no water state, the humidifier will be burned up and it is dangerous. Therefore, the inventor in view of those shortcomings has invented this improvement which provides the needle detector set into the cistern and a better circuit for the system so as to attain safety and practical ends.

Figure 1:
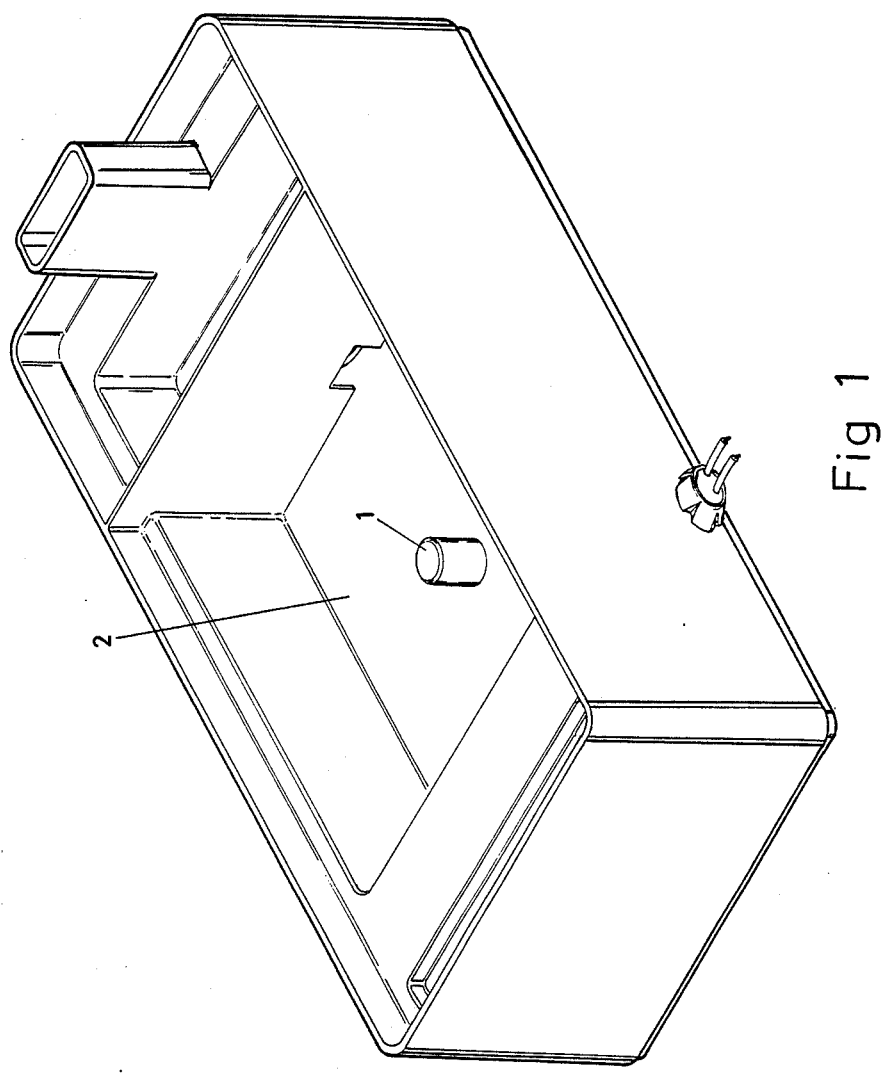
FIG. 1 is a three dimensional diagram of the needle detector in the cistern of this invention.
Figure 2:
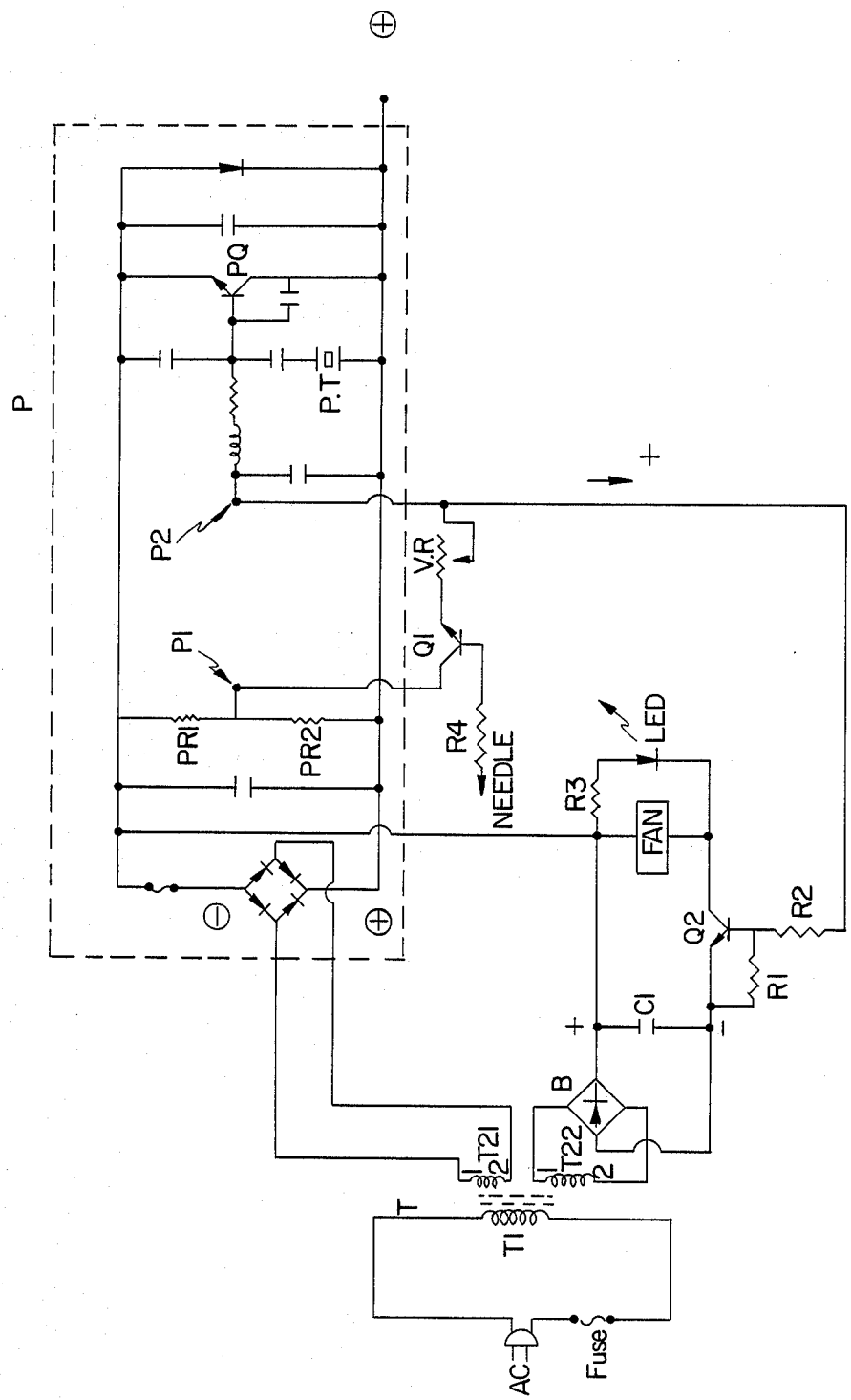
FIG. 2 is a circuit system diagram of this invention.

Referring to FIGS. 1 and 2 there are shown the optimum inventive examples of this proposal. As shown in FIG. 1, the needle detector (1) of this proposal is put into the cistern (2) and combined with the body of the humidifier. For this reason trouble will be avoided and it will attain the ends of safety and correct detection without any error in detecting when the humidifier tips to the left or right.

Please refer to FIG. 2 which shows the invention circuit system of the humidifier of this proposal. In this figure, the secondary side of the transformer (T1) connected to the AC source current is divided into two sets of output coils (T21 and T22). The individual output voltage of the two sets of coils of the secondary side all do not exceed AC 30 V (unlike the traditional type humidifiers in which individual output voltage of the two sets of the secondary side all exceed AC 48 V). One of the coils (T21) is directly suppling AC source to the ultrasonic circuit (p) (which includes a bias supply loop). AC output of the other coil (T22) is applied across a bridge rectifier (B) and a filter capacitor (C1) which change the AC to DC source current to supply the circuit of the fan motor. At this time, if the variable resistance (VR) has the position as shown in FIG. 2 and the needle detects the correct water level, the transistor (Q1) will conduct due to the base getting a positive bias from the needle side. At the same time the bias supply loop will supply a bias to the ultrasonic oscillation circuit and let the transducer operate. Because of (Q1) being conducting, the base of transistor (Q1) will also get a positive bias and then the transistor (Q2) will also conduct and make the fan motor run and this humidifier performs the function of supplying humidity. At this moment, we can use the variable resistance (VR) to regulate its spray quantity. When the needle has no output due to the water level not being high enough, then the transistor (Q1) is at the cut off region due to the base not having a positive bias.

Therefore, it will directly cut off the positive bias of the bias supply loop so that the bias supply loop will have signal output. The ultrasonic oscillation circuit will also be at the cut off state and the transducer will not be running. The transistor (Q2) will also be at the cut off region due to the base not having positive bias and then the fan motor stops operating. Therefore, all the power supply loop will be cut off while the machine will be in the cut off state. Even if the variable resistance (VR) is not timely turned off there will be caused no danger or burning up this humidifier which attains the practical effect of this improvement.

What is claimed is:

1. An electric humidifier comprising:
   a water cistern;
   an ultrasonic oscillation circuit;
   an ultrasonic transducer connected to the ultrasonic oscillation circuit for being driven thereby;
   a fan;
   a power supply including a transformer having a primary coil connectable to a source of AC supply current, a first secondary coil supplying AC power directly to the ultrasonic oscillation circuit, and a second secondary coil connected to a rectification circuit for supplying DC power to the fan;
   a bias current supply loop circuit for supplying a bias current to the ultrasonic oscillation circuit, the bias current supply loop circuit including a first transistor biased via a variable resistor for conducting when a positive bias is applied to a base thereof, and a second transistor arranged for conducting supply current to the fan when a positive bias is supplied to a base thereof upon conduction of said first transistor; and
   water level detector means arranged at a bottom of the cistern for detecting a normal water level condition and an insufficient water level condition, the water level detector means including a needle detector connected for supplying a positive bias to the base of the first transistor when a normal water level is present in the cistern, whereby when an insufficient water level is present in the cistern the needle detector cuts off supply of positive bias to the base of the first transistor to cause the first transistor to cut off, causing the cutoff of bias current supply to the ultrasonic oscillation circuit and the cutoff of positive bias supply to the base of the second transistor.

* * * * *